United States Patent [19]
Dempster

[11] 3,997,645
[45] Dec. 14, 1976

[54] METHOD OF ROTATIONAL MOLDING A RECTANGULAR MAT

[75] Inventor: William Boyd Dempster, Kettering, England

[73] Assignee: Canathane Roller Corporation, Downsview, Canada

[22] Filed: Oct. 8, 1974

[21] Appl. No.: 513,185

[52] U.S. Cl. .......................... 264/163; 101/401.2; 264/255; 264/311; 264/334; 264/336
[51] Int. Cl.² .................................. B29C 5/04
[58] Field of Search ................. 164/2; 260/75 NP; 264/255, 259, 154, 163, 311, 334, 310, 138, 45.7, 267, 270; 249/137, 138; 83/23; 101/401.1, 401.2, 382 MU

[56] References Cited
UNITED STATES PATENTS

| | | | |
|---|---|---|---|
| 1,623,997 | 4/1927 | Catlin | 164/2 |
| 2,265,226 | 12/1941 | Clewell et al. | 264/311 |
| 3,373,143 | 3/1968 | Chilvers et al. | 260/75 NP |
| 3,483,285 | 12/1969 | Foley | 264/146 |
| 3,489,723 | 1/1970 | Kraft | 260/77.5 |
| 3,837,959 | 9/1974 | Bishop | 264/255 |

FOREIGN PATENTS OR APPLICATIONS

| | | | |
|---|---|---|---|
| 907,299 | 8/1972 | Canada | 264/311 |

OTHER PUBLICATIONS

Dombrow, Polyurethanes 2nd Ed., Reinhold, N.Y. (1965), pp. 21-30 relied on.

*Primary Examiner*—Willard E. Hoag
*Attorney, Agent, or Firm*—Rogers, Bereskin & Parr

[57] ABSTRACT

Method of making a roller is described for applying lacquer and the like to metal sheets to be formed into metal containers. Roller comprises a magnetic cylindrical former and a cover magnetically retained on its curved outer surface. Cover has an outer layer made from a castable material which is selected from the group comprising liquid polymeric systems and liquid prepolymeric systems capable of forming macromolecular structures having elastomeric properties, and an inner layer made from a castable material which is selected from said group, which is capable of bonding with the outer layer and which has particles of iron powder dispersed therein. A method of manufacturing the cover by a centrifugal casting operation is described.

7 Claims, 6 Drawing Figures

METHOD OF ROTATIONAL MOLDING A RECTANGULAR MAT

This application relates to rollers for applying varnish, lacquer, ink and the like to sheet material.

In the manufacture of metal cans for example, the cans are made from blanks stamped from metal sheets which have been precoated with lacquer. The lacquer is applied by rollers having resilient outer surfaces shaped to apply the lacquer to the metal sheets in a predetermined pattern, such that cans assembled from the stamped out blanks are appropriately coated with lacquer. Normally, the lacquer coatings are on the inside surfaces of the cans to prevent chemical interaction of their contents with the metal. In other cases, colored or transparent lacquers are applied to decorate relevant outer surfaces of the metal sheets such that the lacquer coating appears on the outside surfaces of cans assembled from the sheets.

The rollers used to apply the lacquer each conventionally comprise a hollow cylindrical steel former having on its curved surface a covering of a resilient material. The covering is permanent and is applied to the former by a method in which the former is positioned inside a steel shell such that the annular space between the former and shell corresponds to the required thickness of the covering. Liquid covering material or wrapped unvulcanized material is then introduced into this space to fill the same and the whole assembly is placed in an oven to cure the covering material. Finally, the steel former with the covering thereon is removed from the outer cylinder, the inner surface of the latter having previously been coated with a chemical release agent.

It will be appreciated that this method of manufacture involves substantial investment in capital equipment. Further, in the event of wear or damage to the covering, the whole roller must be replaced. Additionally, the roller covering must be ground off and replaced by a fresh covering in the event that a different pattern of lacquer application is required.

With the object of avoiding these disadvantages, one aspect of the present inventon provides a method of manufacturing a cover intended to be wrapped around the curved surface of a cylindrical magnetic former to produce a roller for use in the application of varnish, lacquer, ink, and the like to sheet material. The first step in the method is to centrifugally cast an outer hollow cylindrical layer using a castable material which is selected from the group comprising: liquid polymeric systems and liquid prepolymeric systems capable of forming macromolecular structures having elastomeric properties. After the outer layer has at least partly cured, an inner layer is cast onto its inner surface using a castable material which is selected from said group, which is capable of bonding with the outer layer and which has dispersed therein particles of a magnetic material, the distribution and dimensions of said particles being such as to ensure firm adhesion of the cover to a magnetic former in use. Finally, the cover is cut from end to end to form a rectangular mat which can be wrapped around the curved surface of the former.

The inner layer may be made of the same material as the outer layer or of a different material. It will be appreciated by a person skilled in the art that, where a different material is used it must be chemically compatible with the material of the outer layer.

It is to be understood that the term "prepolymeric system" as used in this specification and in the claims includes so-called "quasi" of "semi" prepolymeric systems which result in prepolymers of low molecular weight. Such systems are discussed, for example, in ORGANIC POLYMER CHEMISTRY by Dr. K. J. Saunders, published by Chapman and Hall of London, 1973.

Further, it should be noted that the expression "magnetic material" used in the specification and in the claims is intended to mean a material which is attracted to a magnet.

In other aspects, the invention provides both a roller comprising a magnetic cylinder former fitted with a cover which is magnetically retained thereon, and a cover per se.

It will be appreciated that a primary advantage of the invention is that the cover can be readily peeled off the former and replaced by a fresh cover. Further, the capital equipment involved in manufacturing the covers can be kept to a minimum. In addition, the cover conforms to the curvature of the former without being unduly stressed.

The invention will be better understood by reference to the accompanying drawings in which.

Figure 1:
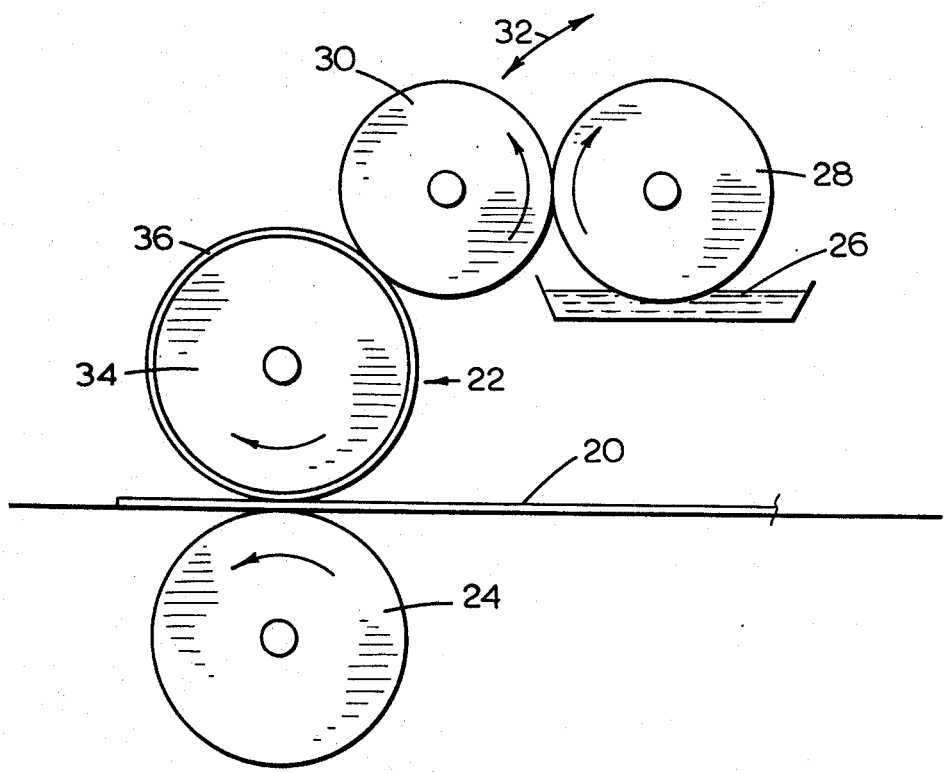
FIG. 1 is a diagrammatic side view of part of a machine used to apply lacquer to metal sheets intended to be made into metal containers.

Referring first to FIG. 1, a metal sheet denoted 20 is shown passing through the nip between a lacquer-applying roller 22 and a back-up roller 24. Lacquer is supplied to the surface of roller 22 from a reservoir 26 by way of a pick-up roller 28 and an intermediate roller 30. Roller 28 is partly immersed in the reservoir 26 and runs in peripheral contact with roller 30, which in turns runs in peripheral contact with roller 22. Provision is made to adjust the position of roller 30, generally in the direction of arrow 32, to vary the amount of lacquer transferred to roller 22 from roller 28 and hence the thickness of the film of lacquer applied to the sheet 20. The rollers are driven in the directions indicated by the arrows.

As has already been mentioned, FIG. 1 is a diagrammatic illustration only. The machine of which the rollers 22, 24, 28 and 30 form a part is of conventional construction. For the sake of clarity, ancillary features of the machine have not been illustrated.

Roller 22 comprises a plain roller body 34 which is magnetic and a resilient cylindrical cover 36 called a "mat." The mat 36 conforms to the curved external surface of roller body 34 and is held thereon by magnetic attraction. As can be seen from FIG. 2, the mat 36 is of double layer construction, comprising an outer layer 38 of a resilient polyurethane material and an inner thinner layer 40 which is of the same polyurethane material but which has powdered iron particles dispersed therein. The two layers 38, 40 are integral and the mat is held on the curved surface of the roller body 34 by the magnetic attraction between the body and the iron particles in layer 40.

Figure 3:
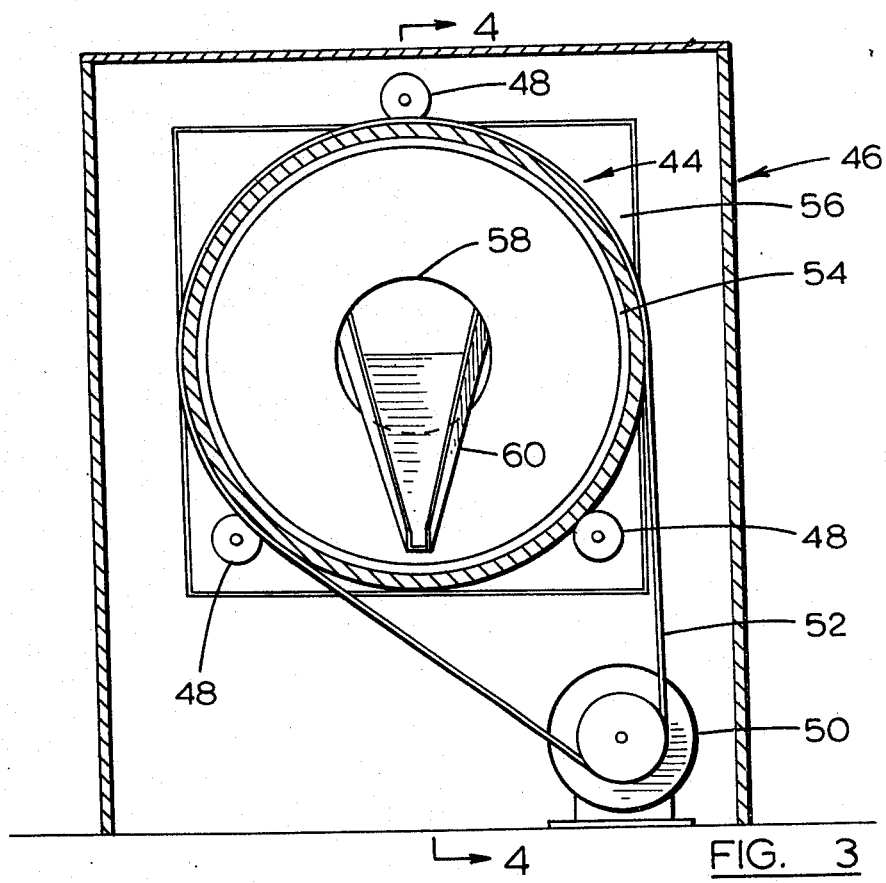
FIG. 3 is a diagrammatic vertical sectional view through a machine used to produce the cover of the roller shown in FIG. 2.
Figure 4:
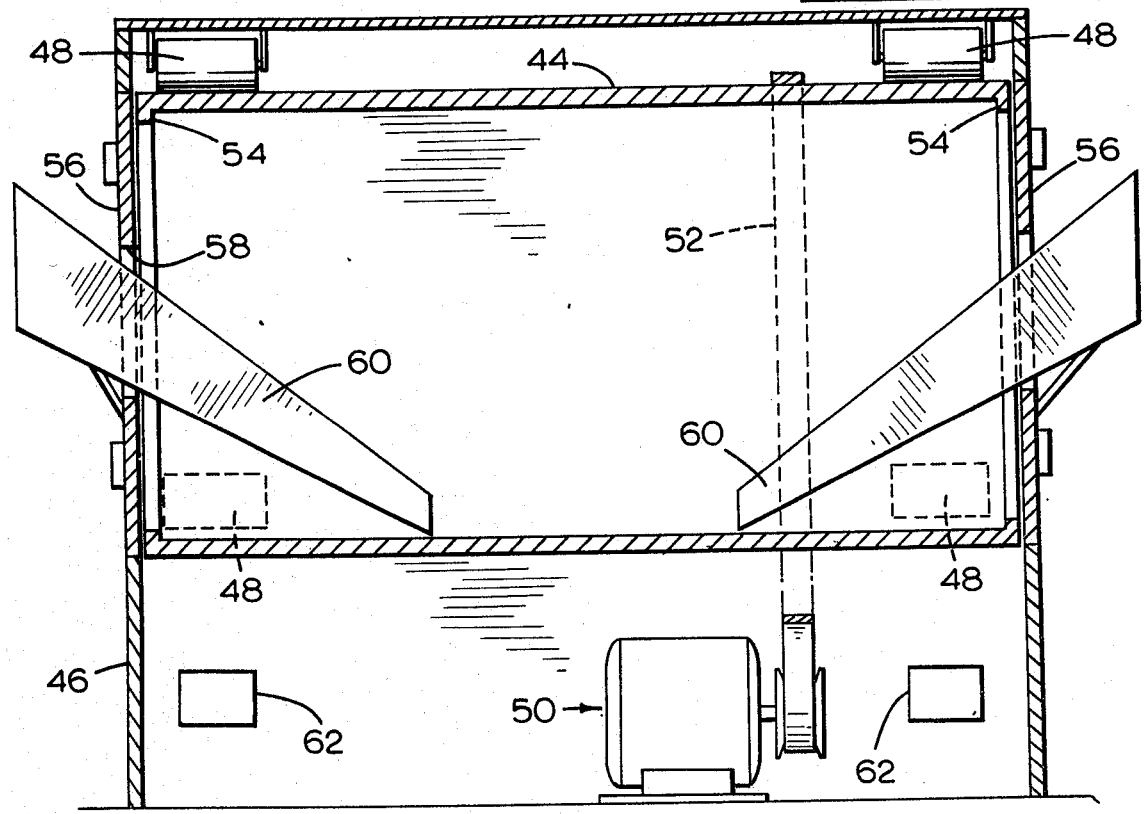
FIG. 4 is a vertical sectional view on line 4—4 of FIG. 3.

The mat 36 is produced by a centrifugal casting operation performed in the machine shown in FIGS. 3 and 4. The machine comprises an open-ended cylindrical drum 44 which is mounted for rotation about its longitudinal axis in a housing 26. The drum is supported adjacent its ends on sets of freely rotatable rollers 48 and an electric motor 50 rotates the drum by way of a belt 52 which passes around the drum. As an be seen from FIG. 4, the drum has an inwardly projecting annular lip 44 at each end. These lips define the thickness of the mat cast in the drum because any excess material introduced into the drum flows out over these lips.

Housing 46 is provided with a hinged access door 56 adjacent each end of the drum. Each door 56 has a circular opening through which a fixed chute 60 projects. The chutes are attached to the respective doors for conveying liquid polyurethane mix into the drum as will be described. The chutes are inclined downwardly towards one another relative to the ends of the drum such that the inner end of each chute is disposed at a distance from the adjacent end of the drum equal to approximately one-third of the total length of the drum. This arrangement causes the mix to flow longitudinally in both directions from the ends of the chutes. It has been found that better distribution of the mix over the length of the drum is obtained by positioning the chutes in this way.

The axial distance between the lips 54 inside the drum 44 is equal to the required axial length of the roller body 34 of roller 36. Similarly, the internal radius of the drum 44 is approximately equal to the required final outer radius of the roller.

In this example, the inside diameter of the drum 44 is 15.42 inches and the length 43 inches. The drum can be rotated at speeds up to 1,450 r.p.m.

In addition to the drum and driving motor described above, the housing 46 of the machine contains electric heaters diagrammatically illustrated at 62, which are capable of maintaining a temperature in the drum in a range of 150° to 212° F. A temperature towards the upper end of the range is the preferred curing temperature for the particular polyurethane mix used in this example (see below). As an alternative to the heaters, the housing could be heated by hot air blown from a domestic-type furnace.

The first step in manufacturing a mat is to cast an outer polyurethane layer. In this example, the layer is approximately 0.350 inches thick. The layer is formed by introducing equal quantities of the liquid polyurethane resin mix into opposite ends of the drum 44 by way of the chutes 60. The liquid resin mix is produced by mixing together the appropriate liquid resin components using a power mixer. Two equal portions of the resulting mix, each of 4544.5 grams are then measured out. With the drum rotating at 1,450 r.p.m., each portion of resin mix is then poured down one of the chutes 60 onto the drum. The centrifugal force due to the rotating drum spreads the mix in a uniform layer over the inside curved surface of the drum. The drum is then left rotating at 1,450 r.p.m. for a time to allow the resin mix to partly cure. For example, the partial cure time may be of the order of 15 minutes. During this time, a second batch of the same polyurethane mix is prepared and powdered iron particles are introduced into the mix. The total weight of the resin mix before the addition of the powder is 3,414.2 grams and the weight of the powder is 8,148 grams. In the present example, this amount of material is sufficient to produce an inner layer of approximately 0.070 inches, giving a total mat thickness of 0.420 inches. The relative specific gravities of the first polyurethane layer to the second layer incorporating the iron powder are 1.47 to 5.20.

The second batch of polyurethane resin mix containing the iron particles is divided into two portions as before. With the drum rotating, again at 1,450 r.p.m., the two portions of the mix are introduced through opposite ends of the drum. Again, the mix flows into a uniform layer. The drum is allowed to rotate for a longer period while the resin cures to that the resulting mat can be handled. For example, a time of 30 minutes would normally be sufficient.

At the end of this time the drum is stopped and the access doors 56 opened. To facilitate removal of the mat, the inside surface of the drum 44 is coated with a chemical release agent before the casting operation begins. Removal of the mat is effected by cutting the same along an axial line and then peeling it off the inside surface of the drum starting at the cut line. The mat is left to fully cure outside the drum. It is then fitted to the roller body 34 by wrapping the mat around the drum until the cut edges abut one another. Final trimming and shaping of the mat can be effected on a grinding machine as is normal with conventional metal decorating rollers. Rollers can be made for applying lacquer in a predetermined pattern by cutting a stencil on the surface of the roller in accordance with the required pattern. In the case of a roller for applying lacquer to sheet metal from which blanks for metal containers are to be stamped, the lacquer is often required to be applied in parallel bands. In this event, spaced peripheral grooves are ground in the surface of the roller so that lacquer is applied only by the ungrooved portions of the surface. This technique may be used to cut a stencil in a mat produced according to the invention and fitted to a roller body as described above. However, according to a modification of the invention as illustrated in FIG. 5, a stencil may be cast into the mat during its manufacture.

Figure 5:
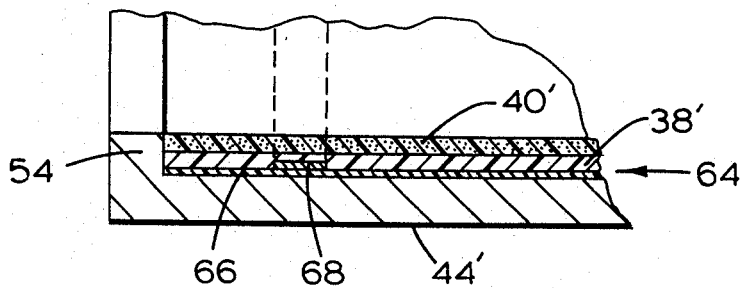
FIG. 5 is an enlarged sectional view of part of the machine of FIGS. 3 and 4, and illustrates a modification of the invention.

FIG. 5 is a sectional view of part of one end of the drum 44 of FIGS. 3 and 4 showing a mat cast in the drum using this technique. In FIG. 5, the mat is of the same composition and dimensions as the mat previously described, the inner and outer layers of the mat being denoted respectively by the reference numerals 40' and 38'.

In accordance with this embodiment of the invention, a master stencil sheet 64 is placed in the drum before the casting operation begins. Sheet 64 comprises a plain flat carrier sheet 66 dimensioned to fit within and cover the inside surface of the drum between the lips 54, and a rectangular section strip 68 which is secured to sheet 66 so as to extend circumferentially around the inner face of sheet 66. The sheet 66 and strip 68 may be made of polyurethane material, preferably a material which is somewhat harder than that from which the mat itself is made. The master stencil sheet 64 is placed inside the drum 44 and positioned, as far as possible, to lie on te inside surface of the drum.

With the sheet 64 positioned inside the drum a silicone release agent is applied to the inner surface of the sheet. The drum is then set rotating and the resulting centrifugal force holds the sheet in intimate surface contact with the inside surface of the drum. The first compounded polyurethane layer 38' is then cast as described previously. It will be noted that this layer 38' is thicker than the height of strip 68 so that the strip forms a groove in the outer surface of the layer which extends a substantial depth into the layer, but does not penetrate the same. The inner layer 40' is then cast onto the outer layer as described previously. Finally, the mat formed by the layers 38' and 40' is cut from end to end and removed from the drum. The chemical release agent prevents the mat sticking to the stencil sheet 64. The stencil sheet can be re-used in similar fashion to cast further mats in the same shape.

It will, of course, be appreciated that whilst only one strip 68 has been shown in FIG. 5, a plurality of such strips may be used. The strips may be of any appropriate shape and size. Further, other shaped sections could be applied in place of the strip to produce virtually any required stencil pattern, dependent on the intended use of the mat.

Figure 6:
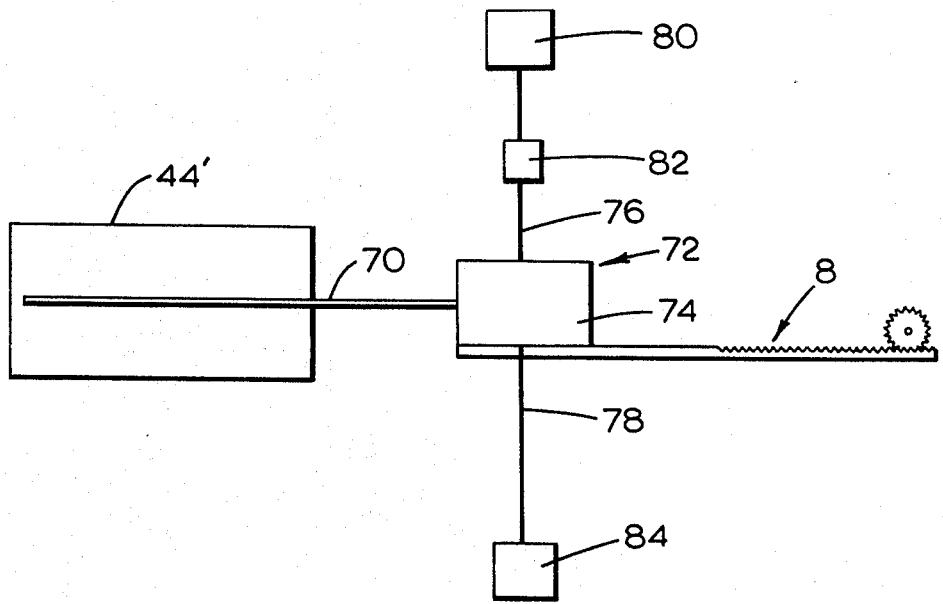
FIG. 6 is a schematic illustration of a modification of the machine of FIGS. 3 and 4.

FIG. 6 is a schematic view showing a modification of the machine of FIGS. 3 and 4 and illustrates an alternative method of introducing the compounded polyurethane resin into the drum. In this embodiment, the drum is denoted 44' and is basically similar to the drum shown in FIGS. 3 and 4, being mounted for rotation about its longitudinal axis in similar fashion to drum 44; accordingly, details of the drum mounting, drive and the housing by which it is surrounded have been omitted from FIG. 5. The drum 44' shown in this view differs from drum 44 in that it has a central aperture at one end only. A tube 70 projects through this aperture from a metering machine generally designated 72 by which the compounded polyurethane resin is introduced into the drum 44'.

The metering machine is basically of standard construction and includes a mixing unit 74, including a mixing chamber which is connected to the tube 70 and along which material is pumped from the chamber. Two inlet lines 76, 78 are provided for the mixing chamber. Line 75 includes a container 80 for a first component of the polyurethane resin composite (the prepolymer) and a vacuum chamber 82 for degassing the material as it flows from container 80 to the mixing chamber. Line 78 includes a combined container and vacuum chamber 84 for the other component of the polyurethane composite (the filler, plasticizer, curative and catalyst). The machine includes pumps and ancillary control equipment as are conventional in machines of this type.

The vacuum chamber 82 and container 84 are connected to the mixing unit 74 by flexible conduits and the unit is mounted for movement axially of drum 44' by means of a rack and pinion diagrammatically indicated at 86. In use, the two components of the compound polyurethane resin are mixed in the mixing chamber and the resulting mix is discharged from tube 70 at a controlled rate. The mixing unit 74 is positioned so that the outlet end of tube 70 is initially disposed adjacent the left hand end of drum 44' in FIG. 6. With the drum rotating and the liquid polyurethane mix issuing from the outer end of tube at a controlled rate, the mixing unit 74 is moved away from the drum 44' at a controlled rate dependent on the rate of flow of the material through tube 70. The flow rate and the speed of movement of unit 74, and hence the rate of withdrawal of tube 70 are carefully selected so that a uniform layer of polyurethane material is deposited on the inside surface of the drum.

Figure 2:
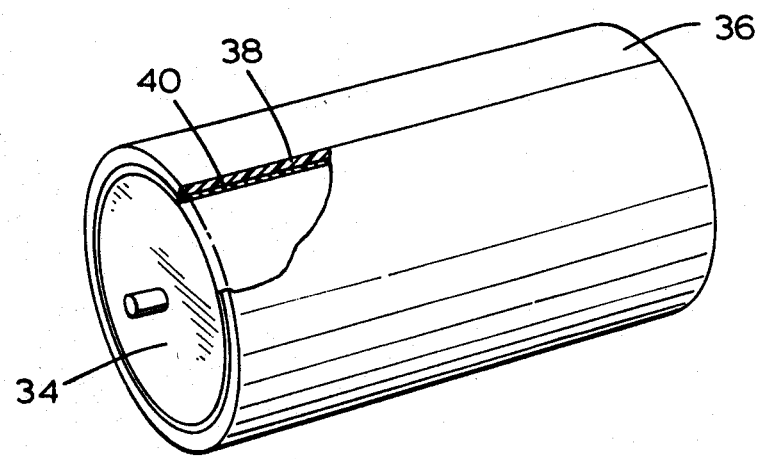
FIG. 2 is a perspective view of a part of the lacquer-applying roller of FIG. 1, the roller cover being shown partly broken away.

The polyurethane mix used to produce the mats shown in FIGS. 2 and 5 is of the following general composition:
1. Urethane prepolymer
   e.g., isocyanate-terminated polyester prepolymer isocyanate-terminated polyether prepolymer
2. Filler
   e.g., silica (particle size range of 1 – 7 microns) calcium carbonate (particle size of 1 – 7 microns)
       silane treated silica (particle size less than 1 micron)
       silane treated calcium carbonate (particle size of 1 micron)
3. Plasticizer or diluent which is compatible with urethane
   e.g., dipropylene glycol dibenzoate tricresyl phosphate
       di(2-methoxy ethyl) phthalate
4. Urethane crosslinking and chain extending agent
   e.g., trimethylolpropane (triol) 1,4-butanediol (diol)
       4,4'-methylene bis (orthochloramiline) (diamine)
5. Catalyst
   e.g., triethylenediamine (amine type)
       dibutyltin dilaurate (metal salt type)
       stannous octoate (metal salt type)
       p-toluenesulphonic acid (acid type)
       triethylenediamine/stannous octoate (synergistic type)

This mix is used for the outer layer. The inner layer is made from the same mix in this embodiment. Alternatively, the inner layer may be made from another chemically compatible polymeric or prepolymeric liquid vehicle, e.g., polysulphide (liquid), polymercaptan (liquid). The inner layer has iron powder (fine particle size, 325 mesh) added to it.

The specific composition of the mix for the outer layer is as follows:

| | | | |
|---|---|---|---|
| (urethane prepolymer) | *Cyanaprene A-9 (N=C=O=4.2) | 100 | parts |
| (filler) | silica (particle size of 7 microns) | 60 | parts |
| (plasticiser) | dipropylene glycol dibenzoate | 65 | parts |
| (curative) | trimethylolpropane | 4.28 | parts |
| (catalyst) | triethylenediamine | 3 | parts per hundred of trimethylolpropane |

*Cyanaprene A-9 is an isocyanate-terminated polyester prepolymer manufactured by American Cyanamid Company, Bound Brook, New Jersey, 08805.

The mix for the inner layer is the same as for the outer layer but with the addition of 400 parts of iron powder.

It will be appreciated that other polyurethanes and materials other than polyurethanes may be used in the method of the invention. Examples of other possible liquid prepolymeric and liquid polymeric vehicles:
   liquid polysulphides
   liquid polymercaptans
   liquid nitriles
   liquid halogenated polybutadienes
   liquid carboxyl-terminated copolymers of butadiene and acrylonitrile
   liquid mercaptan-terminated copolymers of butadiene and acrylonitrile
   liquid carboxyl-terminated polybutadienes liquid hydroxyl-terminated polybutadienes
liquid hydroxyl-terminated copolymers of of butadiene and acrylonitrile
liquid amino functional adducts of polysulphides and polymercaptans
liquid amino functional adducts of dibromopolybutadienes
polyvinyl chloride plastisols
liquid silicone elastomers

What I claim is:

1. A method of manufacturing a cover intended to be wrapped around the curved surface of a cylindrical magnetic former to produce a roller for use in the application of coatings to sheet material, the method comprising the steps of:
   providing a hollow cylindrical drum which is rotatable about a generally horizontal axis, the drum having a continuous cylindrical inner surface defining an open cylindrical cavity;
   rotating the drum about said generally horizontal axis;
   centrifugally casting an outer hollow cylindrical layer of said cover by introducing into said cavity of the rotating drum, a castable material which is selected from the group consisting of liquid polymeric systems and liquid prepolymeric systems capable of being molded and cured to solid macromolecular structures having elastomeric properties, and allowing said material to flow under the effect of centrifugal force to form on said inner surface of the drum a continuous hollow cylindrical layer of substantially uniform thickness;
   after said layer has at least partly cured, centrifugally casting onto its inner surface an inner layer of said cover by introducing into said cavity of the drum, a castable material which is selected from said group, is capable of bonding with the outer layer, and which has particles of a magnetic material dispersed therein, the proportion and dimensions of the said particles being such as to ensure film adhesion of the resulting cover to a magnetic former in use, and allowing the material of said inner layer to flow under the effect of centrifugal force to form on said layer a continuous hollow cylindrical inner layer of substantially uniform thickness, containing said particles of magnetic material;
   allowing said inner layer to partially cure so the resulting mat can be handled;
   cutting said layers from end to end while said layers are in said cavity to facilitate removal of said layers and form a rectangular mat which can be wrapped around the curved surface of a cylindrical magnetic former;
   removing said mat from said cavity of the drum; and
   fully curing said layers outside said cavity.

2. A method as claimed in claim 1, wherein the cover is of approximately 15 inches in external diameter and where the said layers are cast at a rotational speed in the region of 1,400 r.p.m.

3. A method as claimed in claim 1 further comprising the step of positioning a master stencil sheet inside the stationary drum before the mat is cast, the said sheet having on its inner surface raised portions shaped in accordance with the required final contour of the external surface of the mat, whereby the said portions produce complementary recesses in the outer layer cast in the drum.

4. A method as claimed in claim 1, wherein the said castable material is of the following general composition:
   1. Urethane prepolymer
   2. Filler
   3. Plasticizer or diluent compatible with urethane
   4. Urethane crosslinking and chain extending agent
   5. Catalyst.

5. A method as claimed in claim 4, wherein the material is of the following composition:
   cyanaprene A-9 (N—C=O=4.2) 100 parts
   silica (particle size of 7 microns) 60 parts
   dipropylene glycol dibenzoate 65 parts
   trimethylolpropane 4.28 parts
   triethylenediamine 3 parts per hundred of trimethylolpropane
and wherein the said inner layer includes 400 parts of iron powder of 325 mesh size.

6. A method as claimed in claim 5, which is performed at a temperature in the range 150° to 212° F.

7. A method of manufacturing a cover intended to be wrapped around the curved surface of a cylindrical magnetic former to produce a roller for use in the application of coatings to sheet material, the method comprising the steps of:
   providing a hollow cylindrical drum which is rotatable about a generally horizontal axis, the drum having a continuous cylindrical inner surface defining an open cylindrical cavity;
   rotating the drum about said generally horizontal axis;
   centrifugally casting an outer hollow cylindrical layer of said cover by introducing into said cavity of the rotating drum, a castable material which is selected from the group consisting of liquid polymeric systems and liquid prepolymeric systems capable of being molded and cured to solid macromolecular structures having elastomeric properties, and allowing said material to flow under the effect of centrifugal force to form on said inner surface of the drum a continuous hollow cylindrical layer of substantially uniform thickness;
   after said layer has at least partly cured, centrifugally casting onto its inner surface an inner layer of said cover by introducing into said cavity of the drum, a castable material which is selected from said group, is capable of bonding with the outer layer, and which has particles of a magnetic material dispersed therein, the proportion and dimensions of the said particles being such as to ensure firm adhesion of the resulting cover to a magnetic former in use, and allowing the material of said inner layer to flow under the effect of centrifugal force to form on said outer layer at a continuous hollow cylindrical inner layer of substantially uniform thickness, containing said particles of magnetic material;
   fully curing said layers; and
   cutting said layers from end to end to form a rectangular mat which can be wrapped around the curved surface of a cylindrical magnetic former and removing said rectangular mat from inside of said drum.

* * * * *